United States Patent [19]

Nafziger et al.

[11] Patent Number: 4,552,903

[45] Date of Patent: Nov. 12, 1985

[54] FLEXIBLE POLYURETHANE FOAMS PREPARED FROM COTRIMERS OF ALKYLENE-BRIDGED POLYPHENYLENE POLYISOCYANATES

[75] Inventors: John L. Nafziger, Lake Jackson; Mark A. Snyder, Angleton; Larry W. Mobley, Lake Jackson, all of Tex.

[73] Assignee: The Dow Chemical Company, Midland, Mich.

[21] Appl. No.: 685,290

[22] Filed: Dec. 24, 1984

[51] Int. Cl.[4] ............................................. C08G 18/14
[52] U.S. Cl. .................................. 521/137; 521/159; 521/160
[58] Field of Search ...................... 521/137, 159, 160

[56] References Cited

U.S. PATENT DOCUMENTS 4,390,645 6/1983 Hoffman et al. ..................... 521/137
4,452,922 6/1984 Speranza et al. .................... 521/137
4,477,602 10/1984 Liang et al. .......................... 521/137

Primary Examiner—Maurice J. Welsh
Attorney, Agent, or Firm—G. C. Cohn

[57] ABSTRACT

Flexible polyurethane foams having improved flame resistance and "guide factor" are prepared by reacting a copolymer polyahl, isocyanate-terminated prepolymer containing a cotrimer of MDI and a blowing agent.

10 Claims, No Drawings

FLEXIBLE POLYURETHANE FOAMS PREPARED FROM COTRIMERS OF ALKYLENE-BRIDGED POLYPHENYLENE POLYISOCYANATES

BACKGROUND OF THE INVENTION

This invention relates to flexible polymer foam, more particularly to polyurethane foams having improved flame resistance and physical properties.

Flexible polymer foams are widely used in many applications, notably furniture and automobile seat padding. In these applications the burn characteristics of the foam are important. Flammability of the foam is therefore generally minimized to the extent possible.

Various methods are known to reduce the flammability of polymer foams. Commonly, additives such as aluminum trihydride or phosphous-containing compounds are incorporated into the foam for this purpose. Alternatively, halogenated polyols, especially brominated polyols such as dibromoneopentyl glycol, are used to increase the flame resistance in the foam. None of these additives have proved entirely satisfactory.

It is known that the incorporation of trimerized polyisocyanates (i.e. isocyanaurates) into a foam improves its burn characteristics. For example, trimerized toluenediisocyanate (TDI) has been used to prepare flexible foams. Although these foams do exhibit good foam characteristics, they also have poor physical properties, particularly poor compression sets and partial cell collapse. In addition, trimerized toluene diisocyanate tends to precipitate from the isocyanate solution in which it is dissolved, causing storage problems and a lack of uniformity in foams prepared therewith.

In U.K. Patent Specification No. 1,337,659, a solution of a cotrimer of TDI and a bis(4-isocyanatophenyl) methane (MDI) was used to prepare a flexible foam. No substantial improvement in the performance of this cotrimer solution relative to a TDI trimer solution was noted. The polyol used in preparing the film was not a polymer polyol, i.e. did not contain dispersed polymer particles.

Due to the deficiencies associated with previously known flexible polyurethane foams, it would be desirable to provide a foam having good burn characteristics as well as satisfactory physical properties.

SUMMARY OF THE INVENTION

The present invention is a polyurethane foam having good burn characteristics and physical properties. The foam of this invention comprises the reaction product of a reaction mixture comprising:

(a) a dispersion of polymer particles in a continuous phase which comprises a relatively high equivalent weight polyahl, (b) an isocyanate terminated prepolymer containing a plurality of isocyanurate groups formed by the trimerization of an alkylene-bridged polyphenylene polyisocyanate and at least one other polyisocyanate, and (c) a blowing agent.

The foam of this invention has excellent burn characteristics and good load bearing to weight properties, as compared to a similar foam prepared using trimerized TDI or TDI itself as the isocyanate. In addition, the foam of this invention has a good compression set and exhibits substantially no cell collapse. Moreover, the demold time for these foams, i.e. the required residence time of the foaming reaction mixture in the mold before demolding, is substantially reduced.

DETAILED DESCRIPTION OF THE INVENTION

The foam of this invention is the reaction product of a mixture comprising three critical components: (a) a relatively high equivalent weight polyol having polymer particles dispersed therein (hereinafter polymer polyol), (b) an isocyanate-terminated prepolymer containing a cotrimer as described hereinafter, and (c) a blowing agent.

The prepolymer comprises the trimerization product of an alkylene-bridged polyphenylene polyisocyanate and at least one other polyisocyanate, dispersed or dissolved in an isocyanate-terminated prepolymer which may be chemically bonded to said cotrimer.

The alkylene-bridged polyphenylene polyisocyanate employed herein includes bis(4-diisocyanatophenyl) methane, and polymeric derivatives thereof as well as homologs and inertly substituted derivatives thereof. The methylene-bridged materials are referred to herein as MDI (when the functionality the functionality is about 2) or polymeric MDI (when the functionality is greater than 2). Preferably the alkylene-bridged polyphenylene polyisocyanate is MDI or polymeric MDI having a functionality of about 2.0 to 4. More preferably the alkylene-bridged polyphenylene polyisocyanate is MDI or a polymeric MDI having a functionality of about 2.0 or about 2.6 to 3.0. It has been found that the use of polymeric MDI having a functionality in the range from about 2.1 to 2.5 has a somewhat adverse effect on the compression set of the resulting foam, even though higher and lower functional materials provide a foam with excellent compression set.

The other polyisocyanate may be any other than a alkylene-bridged polyphenylene polyisocyanate which forms a cotrimer therewith. The other polyisocyanate may be aliphatic, e.g. hexamethylene diisocyanate, or cyclohexane-1,3-and/or 1,4-diisocyanate. Preferably, the other polyisocyanate is aromatic. Suitable aromatic polyisocyanates include, for example, 2,4-toluene diisocyanate (TDI), 2,6-toluene diisocyanate and mixtures thereof, phenyl diisocyanate, m- or p-xylylene diisocyanate and the like. Most preferably, the other polyisocyanate comprises 2,4- and/or 2,6-toluene diisocyanate.

The cotrimer is prepared from at least about 20 mole percent of the alkylene-bridged polyphenylene polyisocyanate, preferably from about 20 to about 150 and more preferably 50 to 100 mole percent thereof, based on the amount of the other polyisocyanate used in preparing the cotrimer. The most preferred cotrimer is prepared from approximately equimolar quantities of the alkylene-bridged polyphenylene polyisocyanate and the other polyisocyanate.

The cotrimer is dissolved or dispersed in, or a component of, an isocyanate-terminated prepolymer. Such prepolymer is the reaction product of a polyahl (i.e. a compound having a plurality of Zerewitnoff hydrogen atoms) and a stoichiometric excess of a polyisocyanate. The polyahl employed in preparing the urethane prepolymer can be a polyamine, polyol, polyacid, polymercaptan or other compound having at least 2 hydrogens displaying significant activity according to the Zerewitnoff test described by Woller in the Journal of American Chemical Society Vol. 49 page 3181 (1927). Polyols are generally preferred. Advantageously, such polyol is one which by its presence in the prepolymer reduces the tendency of the cotrimer to precipate therefrom. Preferably the polyol is a short chain diol such as propylene glycol, neopentyl glycol, dipropylene glycol, tripropylene glycol, and 1,4-butane glycol. The polyahl is employed in an amount sufficient to reduce the precipitation of the cotrimer from the prepolymer but in less than that amount which causes adverse effects, particularly reduced elongation and higher stiffness in the foam. Generally, the polyahl comprises about 1–10% by weight of the prepolymer. Preferably, the polyahl comprises about 3–6% of the weight of the prepoylmer. When the polyahl is employed in such amounts, foams prepared from the cotrimer solution exhibit surprisingly good elongation and other desirable properties.

The polyahl is reacted with an excess of a polyisocyanate to form the prepolymer. Any of the polyisocyanates described hereinbefore, including TDI, MDI, and polymeric MDI are suitable herein. The polyisocyanate used in preparing the urethane prepolymer is preferably one or more of those used in preparing the cotrimer.

It is generally preferred that the cotrimer be chemically bonded to at least a portion of the prepolymer. It is readily seen that following the preparation of the prepolymer, the prepolymer may be reacted with itself or with another polyisocyanate as needed to form the cotrimer. Conversely, the cotrimer may be preformed and used as all or part of the polyisocyanate in the formation of the urethane prepolymer. In either instance, the preferred bonding of the cotrimer to the prepolymer is achieved.

The preferred isocyanate-terminated prepolymer is prepared according to the general procedure described in our copending application entitled "Process For Preparing Stable Solutions of Trimerized Isocyanates In Monomeric Polyisocyanates" filed on even date herewith. In general, that process comprises preparing in a first step a prepolymer from a polyol, preferably a short chain diol, and one of the polyisocyanates used in the formation of the cotrimer which is not a alkylene-bridged polyphenylene polyisocyanate. The resulting prepolymer is then reacted with the alkylene-bridged polyphenylene polyisocyanate to form a cotrimer. The cotrimer is then reacted with an additional amount of a polyol to form a second prepolymer, which is optionally diluted with monomeric polyisocyanate to form the product prepolymer.

Also useful herein are MDI-TDI cotrimer solutions as described in U.K. Patent Specification No. 1,337,659.

Polymer polyahls, i.e. dispersions of polymer particles in a continuous polyahl phase, and their use in preparing flexible polyurethane foams are well known. Suitable polymer polyahls are described, for example in U.S. Pat. Nos. Re. 28,751, 3,304,273, 3,823,201, 4,242,249 and 4,394,491.

Generally the polymer ployahl has a continuous phase comprising a polyahl of a type useful in preparing a flexible polyurethane foam. Such polyahls are described in U.S. Pat. No. 4,394,491. Useful polyahls include polyamines, polyols, polymercaptans, polyacids or other active hydrogen containing compounds. Polyols are generally preferred. Of these, polyester polyols and polyether polyols are most preferred. Most preferred are polyether polyols with a functionality of about 2–4, especially 2–3, and a hydroxy equivalent weight of about 200 to 1000, especially 400–3000.

Dispersed in said polyahl are a plurality of discrete polymer particles. These particles typically have a volume average particle size of about 0.01 to 10 microns. Said particles may comprise a polyurethane and/or polyurea polymer as described in U.S. Pat. No. 4,374,209, or preferably, an addition polymer as decribed in U.S. Pat. No. 4,394,491. Of the addition polymers, polymers or copolymers of vinyl aromatic monomers, vinyl esters, vinyl halides and acrylonitrile are preferred, with polymers of styrene and/or acrylonitrile being are most preferred.

The dispersed phase generally comprises from about 5 to 60, preferably 20 to 45% of the weight of the polymer polyahl.

In order to improve the stability of the dispersed particles in the polyahl, it is known to graft the polymer particles to a portion of the polyahl which is modified to contain polymerizable ethylenically unsaturated grafting sites. Such grafting sites are commonly introduced to the polyahl by reacting the polyahl with a difunctional compound which contains an ethylenically unsaturated group and a group which reacts with an active hydrogen containing compound. Ethylenically unsaturated acids such as acrylic acid, fumaric acid, maleic acid, methacrylic acid and the like, as well as unsaturated isocyanates such as vinylisocyanate, isopropenyl isocyanate, isocyanatoethylmethylacrylate and the like are especially useful as the difunctional reactant. The use of these and other difunctional reactants are described, for example, in U.S. Pat. No. 4,394,491.

A blowing agent, i.e. a material which volitilizes or reacts to form a gas under the conditions of the reaction of the polymer polyahl and the urethane prepolymer, is also required in this invention. Such blowing agents include materials which boil at the temperatures of the prepolymer-polymer polyahl reaction, such as low boiling halogenated hydrocarbons including fluorotrichloromethane, dichlorodifluoromethane, methylene chloride and the like. Also useful are materials which react to form a gas under the conditions of the prepolymerpolymer polyol reaction. Such materials include water and the so-called azo blowing agents. Preferred are water, low boiling halogenated hydrocarbons and mixtures thereof.

Sufficient of the blowing agent is employed to provide a cellular structure to the polymer. Preferably, sufficient of the blowing agent is used to provide the polymer with the densities of about 1 to 5 lbs/ft$^3$, preferably 1.8 to 3.0 lbs/ft$^3$. With water as the blowing agent, about 0 to 5 parts by weight blowing agent per 100 parts polyahl employed in the foam are typically used. With a halogenated hydrocarbon blowing agent, preferably about 0 to 15 parts of blowing agents are used per 100 parts of polyahl.

In addition to the foregoing critical components, various optional materials are advantageously employed in the preparation of the foam of this invention.

A polyahl in addition to the polymer polyahl is advantageously and preferably employed herein. Such polyol is generally as described with respect to the polymer polyahl. Of these, polyols are preferred, particularly di- or tri-functional polyols of 200 to 6000 equivalent weight, especially 400 to 3000 equivalent weight. It is also preferred that at least a portion of such polyol contain primary hydroxyl groups when preparing a molded foam. The polyahl generally comprises from about 0 to 60% of the combined weight of the polyahl and polymer polyahl.

In addition, relatively low amounts of relatively low equivalent weight polyahls having an equivalent weight from about 30–200, may also be used herein.

A catalyst for the reaction of the polymer polyahl, additional polyahl if any, and isocyanate terminated prepolymer are generally and preferably employed herein. In addition, when water is used as a blowing agent, a catalyst for its reaction with isocyanate groups in the isocyanate-terminated prepolymer to generate carbon dioxide is also generally employed herein. Ordinarily, the type and the amount of the catalyst employed herein are chosen so that the relative rates of the polymerization and blowing reactions are such that a microcellular foam having substantially uniform cells is obtained. Suitable catalysts for the polymerization reaction include organometal compounds such as organotin, organomercury, or organolead compounds as described in U.S. Pat. No. 2,846,408. Tertiary amine catalysts such as triethylene diamine, triethyl amine, methyl morpholine, N,N-dimethyl aminoethyl piperazine and the like are also useful catalysts for the polymerization reaction. Tertiary amine compounds are especially effective catalysts for the water blowing reaction. Generally, such catalysts are employed in an amount from about 0.002 to 2, preferably 0.01 to 1 parts per 100 parts by weight of polyahls employed in the reaction mixture.

A wetting agent or surfactant is generally necessary for production of high grade polyurethane foam according to the present invention, since in the absence thereof the foams collapse or contain very large or uneven cells. Nonionic surfactants and wetting agents are preferred. Of these, nonionic surfactants prepared by the sequential addition of propylene oxide and ethylene oxide to propylene glycol, and the solid or liquid organosilicones have been found especially desirable. Other surface active agents which are not preferred include polyethylene glycol ethers and long chain alcohols, tertiary amine or alkyl amine salts of long chain aliphatic acids, sulfate esters, alkyl sulfonic esters and alkyl aryl sulfonic acids.

The foam of this invention possesses various advantageous properties which render it useful in various applications. For example, the use of a short chain polyol in preparing the prepolymer does not cause the expected stiffening and reduced elongation in the product foam, of the polyol is used in certain amounts as described hereinbefore. At such levels of use the short chain polyol often actually increases elongation and softness.

A further advantage of the foam of this invention is that the compression set and the "guide factor" (ratio of Indentation Force Deflection at 65% deflection to density) are significantly improved relative to conventional foams. Often these foams show an increase of 5 to 100% in guide factor relative to conventional foams.

Due to the presence of the cotrimer, the foam is burn resistant even without the use of flame retarding additives. Typical such foams generally pass a horizontal burn test such as specified in Motor Vehicle Safety Standard 302. In fact, the use of a halogenated short chain polyol in preparing the foam shows only minimal improvement in burn resistance compared to like foams containing no halogenated materials. However, the use of a halogenated polyol surprisingly increases elongation and compression set over like foams prepared with an nonhalogenated analog.

The foam of this invention is advantageously prepared by mixing all reactants, and heating to a temperature sufficient to initiate the polymerization and blowing reactions. Said reaction may be conducted in a closed mold or in an open container. Upon completion of the polymerization and blowing reactions, it may be advantageous to crush the foam to open the cells, thereby increasing flexibility.

The foaming reaction generally proceeds more rapidly than those of conventional foam formulations. Often the demold time for a moldable foam, i.e. the time from the start of the foaming reaction until the foam has sufficient integrity to be removed from the mold without significant physical distortion, is reduced by up to 50% or more compared to conventional foam formulations.

The following examples are provided to illustrate the invention and are not intended to limit the scope thereof. All parts and percentages are by weight unless otherwise indicated.

GENERAL PROCEDURE FOR PREPARING URETHANE PREPOLYMER

The following general procedure is used to prepare the isocyanate-terminated prepolymer of the diverse examples. Exceptions to the general procedure, if any, are noted in each particular example.

A 3-liter resin kettle equipped with stirrer thermometer heater and nitrogen pad is used to prepare the isocyanate-terminated prepolymer. Into the resin kettle is placed a quantity of toluene diisocyanate (TDI) (an 80/20 ratio of 2,4-and 2,6-isomers). The TDI is heated to 55° C. To the kettle is then added a quantity of the first polyahl. The mixture is stirred 2 hours at 55° C. and a quantity of 4,4'-methylenediphenyl diisocyanate (MDI) is added. The temperature is lowered to 45° C. and 1.25 grams of tetramethyl guanidine (TMG) are added. The mixture is then stirred under a nitrogen atmosphere at an elevated temperature to conduct the trimerization reaction. Following the trimerization reaction, the TMG is neutralized with 1.66 grams of benzoyl chloride and the temperature is raised to 140° C. to crack any dimer which may have formed back to the monomeric isocyanate. The cracking of the dimer reduces the refractive index of the reaction mixture. Thus, the progress of the dimer cracking is monitored by measuring the refractive index. When the refractive index reaches a constant value, the dimer cracking reaction is completed. At this point the mixture is allowed to cool to 80° C. and the second polyahl is added and digested 1 hour. The isocyanate content of the reaction mixture is determined and sufficient TDI is added to raise the isocyanate content to about 39.5%. The final cotrimer content is then determined.

EXAMPLE 1

Following the general procedure, a urethane prepolymer is prepared from the following materials.

| | |
|---|---|
| Toluene diisocyanate | 1000 grams |
| 1st polyahl (dipropylene glycol) | 49.6 grams |
| MDI | 100 grams |
| 2nd polyahl (tripropylene glycol) | 68 grams |
| TDI (added as solvent) | 1632 grams |

The trimerization reaction is conducted at 45° C. for 16 hours. The product, referred to herein as Prepolymer Sample No. 1, contains 18.8% by weight trimer and 39.44% NCO.

Comparative Prepolymer Sample No. C-1 is prepared in like manner, except no MDI is employed.

Prepolymer Sample No. 2 is prepared using the following materials:

| | |
|---|---|
| TDI | 1000 grams |
| dipropylene glycol (1st polyahl) | 42.6 grams |
| MDI | 250 grams |
| dibromoneopentyl glycol (2nd polyahl) | 101.9 grams |
| TDI (added as solvent) | 2116 grams |

The trimerization reaction is conducted at 45° C. for 16 hours. The product contains 19% trimer and 39.50% NCO.

Prepolymer Sample No. 3–6 are prepared from the following materials.

| | Sample Number | | | |
|---|---|---|---|---|
| Ingredient | 3 | 4 | 5 | 6 |
| TDI | 700 | 500 | 400 | 250 |
| dipropylene glycol (1st polyahl) | 34.7 | 24.8 | 19.9 | 12.5 |
| MDI | 504 | 710 | 932 | 1000 |
| dibromoneopentyl glycol (2nd polyahl) | 91.2 | 85.4 | 90 | 81.2 |
| TDI | 2050 | 2316 | 1879 | 2208 |
| % Trimer | 17.3 | 20 | 10.6 | 12.6 |
| % NCO | 37.3 | — | 37.3 | — |

The trimerization reaction in Prepolymer Sample Nos. 3 and 4 are conducted at 45° C. for 16 hours. The trimerization reaction is Prepolymer Sample Nos. 5 and 6 are conducted at 70° C. for 4 and 6 hours, respectively.

Foam Sample Nos. 1–6 and C-1 are prepared by mixing in a metal cup at room temperature 316 g of an ethylene oxide capped 4800 MW polypropylene oxide triol, 212 g of a 22% solids dispersion of styrene/acrylonitrile particles (52% AN) in an ethylene oxide capped 4800 MW poly(propylene oxide) triol, 22.1 grams distilled water, 13.7 grams of a silicone surfactant and 11.3 grams amine catalysts. Then, sufficient of the corresponding isocyanate-terminated prepolymer is added to provide a 100 index (equimolar) and mixed for 2–5 seconds. The cup is then emptied into a 15×15×4½" mold which has been preheated to 135° F. The mold is closed and the foam is allowed to rise for 2 minutes, followed by heating at 250° F. for four more minutes. The foam is then demolded and tested as described hereinafter.

The foams are tested for density, tensile strength, elongation, tear strength, resiliency, indentation force deflection, % hystersis, modulus, compression set and guide factor, with the results as indicated in Table I.

TABLE I

| | Foam Sample No. | | | | | | |
|---|---|---|---|---|---|---|---|
| Test | 1 | 2 | 3 | 4 | 5 | 6 | C-1 |
| Density (lb/ft³)[1] | 2.3 | 2.3 | 2.3 | 2.3 | 2.3 | 2.3 | 2.0 |
| Tensile Strength[2] (psi) | 26.5 | 25.3 | 25.3 | 25.2 | 25.4 | 25.8 | 22.6 |
| Elongation (%)[2] | 129 | 119 | 125 | 115 | 116 | 111 | 103 |
| Tear Strength[3] (psi) | 1.8 | 1.8 | 1.7 | 1.8 | 1.8 | 1.7 | 2.10 |
| Resiliency[4] | 42 | 46 | 46 | 53 | 54 | 57 | 46 |
| ILD[5] | | | | | | | |
| 25% | 40 | 43 | 37 | 37 | 27 | 29 | 42 |
| 65% | 110 | 119 | 106 | 110 | 85 | 87 | 81 |
| return 25% | 27 | 30 | 26 | 28 | 20 | 22 | 30 |
| % Hysteresis[2] | 68 | 70 | 70 | 76 | 74 | 76 | 71 |
| Modulus[6] | 2.75 | 2.77 | 2.86 | 2.97 | 3.15 | 3.0 | 1.73 |
| Compression set[7] | 35.7 | 21.4 | 21.2 | 17.5 | 22.2 | 16.4 | 41.3 |
| Guide Factor[8] | 47.5 | 52 | 46.7 | 47.2 | 37 | 37.2 | 41.4 |

[1]ASTM 3574-71 Test A
[2]ASTM 3574-71 Test E
[3]ASTM 3574-71 Test F
[4]ASTM 3574-71 Test H
[5]IFD = Indentation Force Deflection. ASTM 3574-71 Test B
[6]Modulus equals the ratio of 65% ILD to 25% ILD
[7]ASTM 3574-71 Test D
[8]Guide factor equals the ratio of 65% IFD to density The foregoing data illustrates the improvement in foam properties achieved with this invention. All of Foam Sample Nos. 1–6 show an improvement relative to the Comparative Foam Sample in elongation, or guide factor or both. Of particular interest are Foam Sample Nos. 1–4 in which both elongation and guide factors are substantially improved. In these samples, the ratio of TDI:MDI in the trimer is much higher than in Sample Nos. 5 and 6, which are less preferred. It also shows an improvement in compression set, which in some instances is dramatically improved. It is also seen from these data that the remaining properties are roughly comparable to those of the Comperative Foam Sample, except for a significantly higher modulus.

EXAMPLE 2

Various Prepolymer Samples are prepared using roughly equimolar quantities of TDI and MDI and prepared using the general procedure described in Example 1. The trimerization conditions are varied to control the trimer content. The materials used to make the prepolymer are:

| | Prepolymer Sample No. | | | | |
|---|---|---|---|---|---|
| Material | 7 | 8 | 9 | 10 | C-2 |
| TDI | 500 | 500 | 500 | 819 | 500 |
| DPG[1] (1st polyahl) | 24.8 | 24.8 | 24.8 | 41.5 | 24.8 |
| MDI | 710 | 710 | 710 | 1163 | 710 |
| DBNPG[2] (2d polyahl) | 85.4 | 85.4 | 85.4 | 145.4 | 85.4 |
| TDI | 1785 | 2316 | 1744 | 2534 | 1000 |
| Trimerization temperature (°C.) | 45 | 45 | 70 | 70 | — |
| Trimerization Time (hours) | 16 | 16 | 2.2 | 10 | — |
| % Trimer | 26 | 22 | 15 | 8 | 0 |
| % NCO | 37.6 | 39.4 | 39.5 | 39.9 | 39.4 |

[1]DPG = dipropylene glycol
[2]DBNPG = dibromoneopentyl glycol

Foam Sample Nos. 7–10 and Comparative Foam Sample No. C-2 are prepared from the corresponding Prepolymer Sample and tested according to the procedure described in Example 1. The results are as indicated in Table II following.

TABLE II

| | Foam Sample No. | | | | |
|---|---|---|---|---|---|
| Test | 7 | 8 | 9 | 10 | C-2 |
| Density[1] | 2.4 | 2.3 | 2.4 | 2.4 | 2.3 |
| Tensile Strength[2] | 24.7 | 25.2 | 24.6 | 23.9 | 26.0 |
| Elongation[2] | 112 | 115 | 109 | 120 | 120 |
| Tear Strength[3] | 1.8 | 1.8 | 1.9 | 2.0 | 1.9 |
| Resiliency[4] | 50 | 53 | 55 | 52 | 48 |
| IFD[5] | | | | | |
| 25% | 40 | 37 | 32 | 28 | 21 |
| 65% | 118 | 110 | 94 | 85 | 76 |
| return 25% | 30 | 28 | 23 | 20 | 16 |
| % Hysteresis[2] | 75 | 76 | 72 | 71 | 76 |
| Modulus[6] | 2.95 | 2.97 | 2.94 | 3.04 | 3.43 |

TABLE II-continued

| | Foam Sample No. | | | | |
|---|---|---|---|---|---|
| Test | 7 | 8 | 9 | 10 | C-2 |
| Compression Set[7] | 17.8 | 17.5 | 22.0 | 18.1 | 18.0 |
| Guide Factor[8] | 49.2 | 47.2 | 50.0 | 36.1 | 31.5 |

[1]ASTM 3574-71 Test A
[2]ASTM 3574-71 Test E
[3]ASTM 3574-71 Test F
[4]ASTM 3574-71 Test H
[5]IFD = Indentation Force Deflection ASTM 3574-71 Test B
[6]Modulus equals the ratio of 65% ILD to 25% ILD
[7]ASTM 3574-71 Test D
[8]Guide factor equals the ratio of 65% IFD to density Again, substantial improvement in indentation force deflection and guide factor is seen with the foams of this invention. Somewhat lower elongation is seen with the foam of this invention (except for Example 10), which is expected since the Comparative Foam Sample contains no trimers. However, the elongation exhibited by all samples are satisfactory. Other properties are roughly equivalent to those of the Comparative Sample.

What is claimed is:

1. A flexible polyurethane foam comprising the reaction product of a reaction mixture comprising:
   (a) a dispersion of polymer particles in a continuous polyahl phase which continuous phase comprises a relatively high equivalent weight polyahl,
   (b) an isocyanate-terminated prepolymer containing dissolved or dispersed therein a plurality of isocyanurate groups formed by the trimerization of an alkylene-bridged polyphenylene polyisocyanate and at least one other polyisocyanate and
   (c) a blowing agent.

2. The foam of claim 1 wherein said other polyisocyanate is an aromatic polyisocyanate.

3. The foam of claim 1 wherein said alkylenebridged polyphenylene polyisocyanate has a functionality of 2.0 or about 2.6–3.0.

4. The foam of claim 1 wherein said prepolymer comprises the reaction product of a polyisocyanate and a short chain diol.

5. The foam of claim 4 wherein said short chain diol comprises from about 1–10% by weight of the prepolymer.

6. The foam of claim 5 wherein said cotrimer is chemically bonded to said prepolymer.

7. The foam of claim 6 wherein said prepolymer is prepared by reacting a polyisocyanate which is not a alkylene-bridged polyphenylene polyisocyanate with a short chain diol to form a first prepolymer, then reacting said first prepolymer with a alkylene-bridged polyphenylene polyisocyanate for form a cotrimer, and then reacting said cotrimer with a short chain diol to form an isocyanate-terminated prepolymer.

8. The foam of claim 1 wherein the polymer particles dispersed in said continuous polyahl phase comprise an addition polymer.

9. The foam of claim 7 wherein the other polyisocyanate is 2,4-TDI, 2,6-TDI or a mixture thereof.

10. The foam of claim 1 wherein the reaction mixture further comprises a surfactant, and a catalyst for the reaction of the polyahl and the prepolymer.

* * * * *